3,198,457
DRAG FOR FISHING REELS
Joseph M. Holahan, Abington, Pa., assignor to True Temper Corporation, Cleveland, Ohio, a corporation of Ohio
Filed Aug. 3, 1961, Ser. No. 129,053
4 Claims. (Cl. 242—84.45)

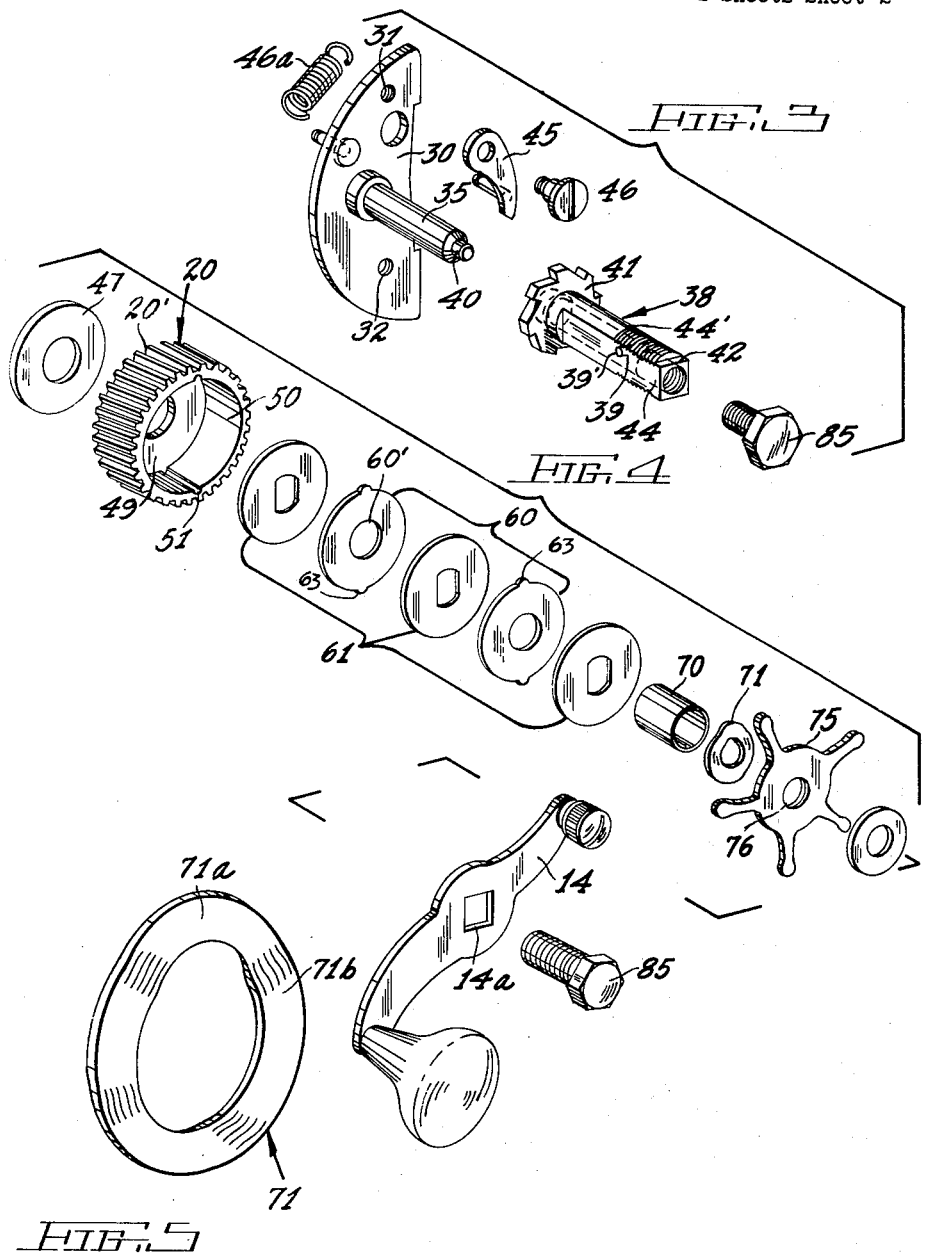

This invention relates to a new and useful improvement in drags for fishing reels and more particularly to improvements in the fishing reel drag mechanism wherein the user of the reel may control the improved drag assembly without affecting the movement of the handle.

My invention provides a drag assembly adapted to exert a uniform drag to achieve maximum effective drag action at all variations of drag pressure.

My invention further provides a drag assembly adapted to exert a uniform drag immediately upon the actuation of manually operable pressure exerting means.

My invention further relates to an improved drag assembly in which there is maximum dissipation of the heat created by the drag action.

In prior art drag mechanisms, non-metallic drag washers are generally employed. Various friction materials are employed such as, e.g., brake lining material and hermetic leather. These friction drag washers are conventionally positioned between a stationary surface and a rotating surface. Thus, in a well-known manner, when the drag is increased a predetermined amount by an adjustable means such as, e.g., a star wheel, a clutching action takes place between the rotating surfaces and the non-rotating surfaces, thus preventing paying out of the line. As will be obvious, the amount of drag is adjustable from a minimum amount where no frictional resistance is encountered by the rotating surfaces to a maximum amount where clutching, as described above, takes place.

In a normal drag setting, the amount of drag is intermediate the minimum and maximum amounts and the friction drag washers function to frictionally resist the movement of the rotating surfaces but not to the extent that "locking" takes place. The heat created by the fricitonal resistance is absorbed and dissipated by the drag washer assembly.

In this above described normal situation, the ideal condition would exist when each side of the friction washer absorbs the friction and heat created thereby equally. This, however, rarely occurs since one side of the friction washer or the other will "seize" either the rotating or non-rotating adjacent washers, leaving the other side of the friction washer to absorb all of the friction resulting from the sliding thereof over the surface of the other adjacent washer. This undesirable situation facilitates rapid heat buildup and results in the rapid "burning out" of the friction washers.

Expressed somewhat differently, due to the fact that the friction washer almost invariably "seizes" the surface of one of the two adjacent washers, the effectivenesss of the non-metallic friction washer is only 50%, the maximum effectiveness occurring only when each side of the friction washer equally absorbs the heat enegy developed by the friction drag.

In my new all-metal drag washer assembly, each friction surface is substantially 100% effective in absorbing the heat energy created by the moving washers and the drag assembly is immediately responsive to the pressure exerting means and entirely independent of the handle whereby the drag may be increased or decreased while the handle is stationary.

A primary object of the invention, therefore, is to provide an improved drag assembly for fishing reels which is immediately actuatable and which more effectively dissipates the heat energy created through the drag mechanism.

A further object is to provide a drag assembly which exerts a uniform drag action at all variations of drag pressure responsive to the movement of the pressure exerting means in either direction.

A further object is to provide a drag assembly in which the drag efficiency is increased, the temperature of the converted heat energy reduced, and which is capable of sustaining the high temperatures and pressures developed during the drag operation, thus prolonging the life of the drag washers.

Yet another object of the invention is to provide a drag assembly for fishing reels which may be removed and installed in a minimum of time with relative ease, and which may be incorporated in presently existing reels in a relatively simple manner.

A further object of the present invention is to provide a novel drag mechanism having the features set forth above which is simple in construction, inexpensive to manufacture, and highly efficient and effective in operation and use.

These and other objects of the present invention and the various features and details of the operation and construction thereof are hereinafter more fully set forth and described with reference to the accompanying drawing, in which:

FIG. 1 is a side elevational view of the fishing reel partially in section illustrating the drag mechanism of my invention;

FIG. 2 is an enlarged, vertical sectional view of the drag mechanism of my invention, showning in more detail the construction thereof;

FIGS. 3 and 4 are exploded views showing the drag assembly and its associated parts;

FIG. 5 is an enlarged, perspective view of the drag spring washer employed in the drag assembly of my invention;

Referring now to the drawings, wherein like reference characters are used to designate like parts, and particularly to FIG. 1, at 10 is shown a conventional fishing reel comprising an end plate 12, spool 13 and handle 14. The handle 14 is adapted to drive spool shaft 15 to wind in the line on spool 13. Under other conditions, spool 13 is adapted to rotate freely, thus allowing "paying out" of the line, while the handle 14 remains stationary.

Assuming that the handle 14 and the spool 12 are in an operable relationship, which exists, as noted above, during the winding operation, the handle 14 drives the spool shaft 15 through a main driving gear 20 and driven gear 21. The said gear 21 is drivingly connected to the spool shaft 15 in any conventional manner, such as, for example, by coupling means (not illustrated).

Referring now to the novel preferred embodiment of the drag assembly of my invention shown in FIGS. 1 to 5, and referring more particularly to FIGS. 2 to 4 thereof, a generally semi-cylindrical bridge member 30 is mounted on an end plate 12 in any desired manner, such as, e.g., by bolt means (not shown) which threadedly engage apertures 31 and 32 in the bridge member 30 and further threadedly engage aligned threaded apertures (not shown) in end plate 12.

Mounted in approximately the center of bridge 30 is a gear post 35 riveted to the bridge at 36 functioning to carry the driving and drag parts for the spool 13. A gear sleeve 38 is journaled on the gear post 35 and is retained axially thereon by pin means 39' positioned in an aperture 39 of the sleeve, the pin 39' being in registry with an annular, undercut groove 40 disposed adjacent the end of the gear sleeve 38. It will be noted that the gear sleeve 38 is provided with a ratchet 41 at the spool end of the sleeve and a square shoulder 42 at the handle end thereof.

my invention is highly effective in absorbing this heat energy by absorbing the heat over as large an area as is possible. This is accomplished when the line is being paid out and the gear 20 is rotating by the fact that faces of the entire area of the drag ear washers 60, which rotate with main gear 20, frictionally slide over the entire area of the faces of both of the abutting surfaces of each of the drag lock type washers 61 positioned on either side thereof. Each face of the drag lock type washer 61 thus equally absorbs the friction, and hence the heat, created by the sliding of washers 60 on washers 61.

As noted above, the heat energy created is considerable and high temperatures are attainable when a hooked fish is carrying the line outwardly. To accommodate these high temperatures and pressures, a dry lubricant is preferably used with my novel drag washer assembly. Heretofore, the use in the prior art of non-metallic friction washers prevented the use of lubricant in the drag assembly since any lubricant employed in such designs would greatly reduce the effectiveness of the friction washer and greatly shorten the life span thereof.

When metallic washers have been previously employed in conjunction with conventional petroleum lubricant, the heat generated tended to evaporate the lubricant. Also, the relatively high pressures tended to squeeze the liquid lubricant from between the metal washers thus making the same ineffective to dissipate the heat.

The preferred dry lubricant overcomes these disadvantages and functions to keep the washers relatively cool, thus greatly increasing the life of the washers. Although the use of various dry lubricants are envisioned, highly satisfactory results have been obtained through the use of graphite or molybdenum disulphide.

It will thus be seen that I have accomplished the objects of my invention. I have provided a drag assembly wherein metallic washers are used throughout, and wherein the metallic washers are so designed to effectuate maximum drag action and maximum dissipation of heat. Further, the pressure exerting means exerts pressure immediately upon actuation thereof, the force being applied in an uniform manner by rotation of the pressure exerting means in either direction. I have provided a drag assembly which is simple in construction, inexpensive to manufacture and highly efficient and effective in operation and use. Further, my novel drag assembly is easily installable and removable and is adapted to be installed in presently existing reels in a relatively simple manner.

While a particular embodiment of the present invention has been illustrated and described herein, it is not intended to limit the invention to such a disclosure and changes may be incorporated and embodied therein within the scope of the following claims.

I claim:

1. In a fishing reel having a spool rotatably mounted therein between a pair of spaced parallel end plates, a gear in driving engagement with said spool, a gear sleeve mounted on and extending outwardly from one of said end plates, said gear sleeve having a threaded end portion, a driving gear rotatably mounted on said sleeve, drag means slidably mounted on said gear sleeve and associated with said driving gear, said drag means consisting of a plurality of metallic drag washers, certain of said washers being rotatable with said gear sleeve and certain of said washers being rotatable with said driving gear, a star wheel threadedly mounted on said gear sleeve, spring means slidably mounted on said gear sleeve and positioned between said drag washers and said star wheel, said spring means having a concavo-convex configuration on each side thereof, whereby said star wheel is adapted to exert an axial force on said spring means and said drag washers whereby said gear sleeve is drivably connected to said driving gear.

2. In a fishing reel having a spool rotatably mounted therein between a pair of spaced parallel end plates, a gear in driving engagement with said spool, a gear sleeve mounted on and extending outwardly from one of said end plates, said sleeve having a pair of longitudinally extending flats and a threaded end portion, a driving gear rotatably mounted on said sleeve, said driving gear having an annular side wall and a recessed bottom wall, a plurality of slots being disposed in the inner surfaces of said annular side wall, metallic drag washer means slidably mounted on said gear sleeve, alternate drag washer means having a plurality of ears extending outwardly from the periphery thereof, said ears projecting into said slots whereby said alternate washers are rotatable with said driving gear, the remaining alternate drag washers having a bore with parallel flats therein, said parallel flats abutting the flats of said gear sleeve whereby said remaining alternate drag washer means are rotatable with said gear sleeve, tubular cylindrical sleeve means slidably and telescopically mounted on said gear sleeve, one end of said tubular sleeve means abutting the outermost drag washer means, concave-convex disc-shaped spring means slidably mounted on said gear sleeve and adapted to abut the other end of said tubular sleeve, star wheel means threadedly received on the threaded end portion of said gear sleeve and positioned outwardly of said spring means, whereby said star wheel is adapted to exert an axial force on said spring means, said bushing, and said drag washers to drivably connect said gear sleeve to said driving gear.

3. In a fishing reel having a spool rotatably mounted therein between a pair of spaced parallel end plates, a gear in driving engagement with said spool, a crank shaft mounted on and extending outwardly from one of said end plates, a gear sleeve mounted on said crank shaft, said gear sleeve having a threaded outer end, a driving gear rotatably mounted on said sleeve and in engagement with said first said gear, said driving gear having an annular wall portion and a bottom wall portion, said annular wall portion having a plurality of slots in the inner surface thereof, a plurality of metallic drag washers slidably mounted on said gear sleeve and positioned within said driving gear, alternate metallic drag washers having projections extending outwardly from the periphery thereof, said projections adapted to be received in said slots in said driving gear whereby said alternate washers rotate with said gear, said gear sleeve having a pair of flat parallel sides on the outer portion thereof, the remaining alternate drag washers each having a pair of parallel flat bore walls, said flat bore walls adapted to abut against said flat sides of said gear sleeve whereby said remaining alternate drag washers rotate with said gear sleeve, all of said drag washers being coated with a dry lubricant, a tubular cylindrical bushing slidably mounted on said gear sleeve and positioned outwardly from said drag washers and abutting the outermost drag washer, spring means positioned outwardly from said bushing, a star wheel threadedly mounted on the outer end of said gear sleeve and positioned outwardly of said spring, said star wheel being adapted to exert a varying axial force on said spring means, said bushing, and said drag washers, whereby when said star wheel exerts a predetermined axial force on said spring, said bushing, and said drag washers, said alternate drag washers will frictionally slide over the surfaces of said alternate remaining drag washers.

4. In a fishing reel having a spool rotatably mounted therein, a gear in driving engagement with the said spool, a sleeve member associated with said reel, said sleeve member having a threaded end portion, a driving gear rotatably mounted on said sleeve member and in engagement with said first gear, drag means slidably mounted on said sleeve member and associated with said driving gear, said drag means consisting of a plurality of metallic drag washers, certain of said washers being alternately rotatable with said sleeve member and said driving gear, pressure exerting means threadedly mounted on said gear sleeve member, disc-shaped spring means slidably mounted on first said sleeve member and abutting said pressure exerting means, a tubular sleeve telescoped over said first sleeve member, said tubular sleeve having an end portion abutting an end drag member and its opposite end abutting said disc-shaped spring means, said spring means positioned between said tubular sleeve and said pressure exerting means, whereby rotation of said pressure exerting means in one direction is adapted to exert an immediate axial force on said spring means, said tubular sleeve and said drag washers, whereby a drag effect on the spool is immediately effected and rotation of said pressure exerting means in an opposite direction is adapted to effect an immediate release of drag.

References Cited by the Examiner

UNITED STATES PATENTS

| | | | |
|---|---|---|---|
| 2,162,774 | 6/39 | Coxe | 242—84.44 |
| 2,408,430 | 10/46 | Lowey et al. | 188—251 |
| 2,643,073 | 6/53 | Bourne et al. | 242—84.45 |
| 2,646,939 | 7/53 | Hirsch | 242—84.45 |
| 2,760,357 | 8/56 | Burns | 242—84.45 X |
| 2,760,736 | 8/56 | Mihalko et al. | 242—84.45 X |
| 2,775,323 | 12/56 | English | 188—251 |
| 2,977,064 | 3/61 | Logan | 242—84.54 |

MERVIN STEIN, *Primary Examiner.*

JOSEPH P. STRIZAK, *Examiner.*

UNITED STATES PATENT OFFICE
CERTIFICATE OF CORRECTION

Patent No. 3,198,457 August 3, 1965

Joseph M. Holahan

It is hereby certified that error appears in the above numbered patent requiring correction and that the said Letters Patent should read as corrected below.

Column 6, line 25, for "bushing" read -- tubular sleeve --.

Signed and sealed this 18th day of January 1966.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,198,457　　　　　　　　　　　　　　　　August 3, 1965

Joseph M. Holahan

It is hereby certified that error appears in the above numbered patent requiring correction and that the said Letters Patent should read as corrected below.

Column 6, line 25, for "bushing" read -- tubular sleeve --

Signed and sealed this 18th day of January 1966.

(SEAL)
Attest:

ERNEST W. SWIDER　　　　　　　　　　　　　　　　EDWARD J. BRENNER
Attesting Officer　　　　　　　　　　　　　　　　Commissioner of Patents